(12) United States Patent
Castellano (10) Patent No.: US 6,406,048 B1
(45) Date of Patent: Jun. 18, 2002

(54) PIVOTLESS REAR SUSPENSION SYSTEM FOR BICYCLES

(76) Inventor: John P. Castellano, 5927 Monte Verde Dr., Santa Rosa, CA (US) 95409

( * ) Notice: Subject to any disclaimer, the term of this patent is extended or adjusted under 35 U.S.C. 154(b) by 0 days.

(21) Appl. No.: 09/658,363

(22) Filed: Sep. 8, 2000

(51) Int. Cl.⁷ .................................................. B62K 3/00
(52) U.S. Cl. ...................................................... 280/284
(58) Field of Search ............................. 280/281.1, 283, 280/284, 285, 286

(56) References Cited

U.S. PATENT DOCUMENTS

| | | |
|---|---|---|
| 398,158 A | 3/1889 | Jeffery |
| 618,627 A | 1/1899 | Travis |
| 621,942 A | 3/1899 | Pierce |
| 2,283,671 A | 5/1942 | Finlay |
| 3,856,285 A | 12/1974 | Yamada |
| 4,856,801 A | 8/1989 | Hollingsworth |
| 5,098,114 A | 3/1992 | Jones |
| 5,217,241 A * | 6/1993 | Girvin ........................ 280/284 |
| 5,405,159 A | 4/1995 | Klein |
| 5,452,911 A | 9/1995 | Klein |
| 5,474,318 A | 12/1995 | Castellano |
| 5,509,679 A | 4/1996 | Leitner |
| 5,533,742 A | 7/1996 | Peart |
| 5,803,477 A * | 9/1998 | Reisinger ................... 280/284 |

OTHER PUBLICATIONS

Page from a dealer catalogue of Moots Cycles, Steam–boat Springs, CO, dated Sep., 2000, showing a pivotless bike frame.

Insert from an owner's manualfor a front suspension fork manufactured by Interloc, Inc., Colma, CA, dated Jul., 1997. This shows a damped elastomer shock system.

* cited by examiner

*Primary Examiner*—Kevin Hurley
(74) *Attorney, Agent, or Firm*—David Dolberg, Esq.

(57) ABSTRACT

An improved bicycle rear suspension system with a triangular wheel suspension component comprising three members; a planar truss chainstay member with a wide lateral side and a thin vertical side, adapted to be longitudinally and laterally rigid and vertically flexible; a seatstay member with an integrated shock absorbing means adapted to dampen the suspension movement, the shock absorbing means being a long-travel, short-length shock absorber with angular deflection capability; and a seat tube member, arranged in a triangular configuration wherein one, two, or all three junctions between the members are pivotless, thereby eliminating rotating pivot elements and providing a low maintenance requirement, durability, high reliability, low manufacturing costs, progressive springing and damping, a comfortable ride, a compact size, and light weight, while increasing lateral and torsional rigidity and wheel travel, and maintaining the strength and aesthetic appeal of the traditional diamond frame.

28 Claims, 3 Drawing Sheets

PIVOTLESS REAR SUSPENSION SYSTEM FOR BICYCLES

BACKGROUND

1. Field of Invention

This invention relates to a suspension system for wheeled vehicles, particularly for two, three, or four-wheeled vehicles, more particularly for bicycles. More specifically, the invention relates to an improved pivotless rear suspension system for a bicycle or other vehicles.

2. Background Art

All references disclosed herein are incorporated by reference. Bicycle suspension systems are so called because they suspend the weight of the rider and bicycle by springs or the like acting upon the wheels, thereby providing isolation from bumps in the road or trail. During the evolution of the bicycle, there have been many attempts to provide a simple and effective rear suspension system. A resurgence of activity in this field has been prompted by the current popularity of dirt road and trail riding, commonly called mountain biking. A well-designed bicycle suspension can improve control and safety, as well as comfort, by keeping the tires in contact with the ground on rough terrain. Most rear suspension systems used to date have been problematic, for reasons explained below.

Problems with Existing Rear Suspensions

The vast majority of suspension systems rely on one or more pivots. Pivots have inherent problems: they are costly to manufacture, they tend to develop squeaks and looseness requiring maintenance and adjustment, they wear out, and they concentrate the suspended movement to a single point rather than distributing the movement over a geometric range.

Previous attempts to utilize pivotless suspensions proved to be too flexible in lateral and torsional loadings, while offering very limited travel.

Many prior-art bicycles use an oil-damped air-sprung shock absorber. They tend to be long, they have many pressurized seals which can leak, and they are not good at isolating the rider from high-frequency trail irregularities.

Prior-Art Bicycles with Pivots

Perhaps the simplest rear suspension is to mount the rear wheel on a swingarm which is pivotably mounted to the rest of the bicycle. A logical place to pivot the swingarm on such a bicycle is at or near the pedal crankshaft so chain tension doesn't vary as the rear wheel swings. An early example of this type of suspension is seen in U.S. Pat. No. 398,158 to Jeffery (1889).

With a modern linkage suspension, such as shown in U.S. Pat. No. 5,509,679 to Leitner (1996), an extra pair of pivots between the rear of the chainstay and the axle of the rear wheel allows increased travel without producing pedaling-induced bobbing. However this type of system tends to be prone to noise and wear, due to contamination of the pivots with dirt, compounded by the high number of pivots.

Prior-Art Pivotless Bicycles

In attempts to eliminate the problems associated with pivots, several suspension designs have utilized the inherent flex characteristics of frame members to achieve suspension action.

Early examples of pivotless suspensions can be seen in the Worth Spring Frame Safety Bicycle, sold circa 1890 by the Chicago Bicycle Company, and in a similar suspension disclosed in U.S. Pat. No. 621,942 to Pierce (1899). Both of these bicycles use full-length leaf springs, of constant rectangular cross section, as chainstay members. The problem with these designs is that the stays are narrow, hence not sufficiently capable of resisting lateral and torsional loading. The resulting excessive lateral flex precludes good handling.

An attempt to resist lateral flex is disclosed in U.S. Pat. No. 618,627 to Travis (1899) which uses a wider plate, but only for the portion of the chainstay in front of the tire. While this helps lateral stiffness, the short length of the flexible plate allows only limited angulation at the front of the chainstay, and cannot accommodate sufficient angulation between the rear of the chainstays and the seatstays. Finlay et al., U.S. Pat. No. 2,283,671 (1949), take a different approach, using flattened tubing for the rearward portion of the chainstays. But again, the short length of the flexible portion reduces the travel which can be attained with this design.

More recently U.S. Pat. No. 5,098,114 to Jones (1992) discloses a pivotless suspension using tubular chainstays made from a highly flexible material such as titanium. A similar example is sold under the mark YBBeat by Moots of Steamboat Springs, Colo. The problem with these designs is that it is impossible to get a round tube to flex vertically without also flexing laterally by a similar amount. Consequently, these bicycles suffer from too much lateral flex, and too little suspension travel. Another problem is that the shock absorber load also goes off-axis under large bumps, which causes binding and wear of the shock absorber to occur.

U.S. Pat. No. 5,405,159 to Klein et al. (1995) discloses a four-bar-linkage suspension with four "x-pivot" type flexures on the chainstays, plus additional mechanical pivots. His proposed configuration lacks adequate bracing for lateral loads, appears impractical to fabricate, and it is not completely pivotless.

Completely pivotless designs are disclosed in U.S. Pat. Nos. 4,856,801 to Hollingsworth (1989) and 5,533,742 to Peart (1996). These references disclose bicycles with the chainstay cantilevered off the main frame. Because of the absence of seatstays, all bicycles of this type suffer from extremely poor torsional stiffness due to independent vertical motion of the left and right ends of the chainstay.

All of the above pivotless systems typically suffer from lateral flex and/or limited travel, and other problems as outlined above. The Applicant discloses both pivoted and pivotless embodiments of a rear suspension system for bicycles that utilizes a swinging pedal crankshaft in U.S. Pat. No. 5,474,318 (1995). A pivotless embodiment (FIG. 8) achieves long-travel with good lateral stiffness by integrating a large x-pivot flexure into its frame. However it is more complicated and expensive and does not have traditional "diamond frame" look. The discussion of suspension operation theory in this patent is useful for the understanding of the instant invention and the patent is specifically incorporated by reference.

Other Relevant Art

U.S. Pat. No. 5,452,911 to Klein et al. disclose a chainstay made from highly manipulated tubing and designed to provide high lateral stiffness. However this design is incapable of vertical wheel travel and is known for riding harshly.

A currently popular design uses a solid machined forward chainstay portion, with a tubular rearward portion. For example, a bicycle sold under the trademark Szazbo by Ibis of Santa Rosa, Calif. has a chainstay bridge with triangular apertures designed to provide high lateral stiffness. However designs of this type lack a long, thin, vertically-flexible chainstay, and must rely on one or more pivots to achieve suspension action.

A shock absorbing apparatus for automobile bumpers is disclosed in U.S. Pat. No. 3,856,285 to Yamada. This shows an elastomeric friction element which slides inside a tube to absorb collision energy. A similar shock absorber system for front bicycle suspension is known by the trademark TL5 sold by Interloc of Colma Calif. Neither of these shock absorbers have the capability for angular deflection which is necessary to eliminate all pivots on a bicycle rear suspension. Also, neither shows an external lubrication system for ease of maintenance, or a long friction surface which distributes the frictional forces over a long region for durability and smooth action.

In summary, prior pivoted bicycles give up simplicity and light weight to provide adequate wheel travel. Prior pivotless bicycles typically exhibit problems with low lateral stiffness and inadequate travel. None provides a simple, lightweight, laterally stiff suspension with adequate travel.

OBJECTS AND ADVANTAGES

Accordingly the objects and advantages of the present invention are:

- to provide a bicycle with a rear suspension having improved characteristics;
- to provide a simple resilient suspension which eliminates rotating pivot elements while maintaining adequate travel and lateral and torsional rigidity;
- to provide a vehicular suspension system with low maintenance requirement, durability, high reliability, low manufacturing costs, a comfortable ride, and light weight to enhance the quality of the riding experience;
- to provide a suspension system which is compact, while still providing the advantages of increased travel, such that the system accommodates frames designed to fit riders of shorter stature while maintaining the strength and aesthetic appeal of the traditional diamond frame.
- to provide a suspension with progressive springing and damping for high performance yet which does not require pressurized gas or fluid, thereby increasing reliability; and,
- to provide a bicycle suspension with a planar truss chainstay structure which is vertically flexible, laterally and torsionally stiff, and easily fabricated.

Still further objects and advantages will become apparent from a consideration of the drawings and ensuing description.

In accordance with the above objectives, and others described herein, the wheel suspension system of the present invention comprises a frame, such as a bicycle frame, with a wheel suspension component for the suspension of a rotatable wheel vertically mounted in the frame. The wheel has a horizontal axle aligned perpendicular to the plane of the wheel. The frame has a triangular wheel suspension component comprising three members (legs of the triangle).

The first member is equivalent to a bicycle chainstay. It has a long axis, a wide lateral side, and a thin vertical side, relative to the lateral side. The first member is adapted to be longitudinally and laterally rigid and vertically flexible. The first member has a wide first end and a bifurcated left/right pair of tapering segments adapted to receive the wheel. The tapering segments have left and right second ends.

The second member is a strut and is equivalent to a bicycle seatstay. It has a long axis, longitudinally expandable and compressible, comprising a unitary top portion with a first end and an integrated shock absorbing means adapted to dampen the longitudinal movement. It also has a bifurcated left/right pair of bottom segments adapted to receive the wheel. The bottom segments have left and right second ends. The bottom left end of the second member is attached to the second left end of the first member and the bottom right end of the second member is attached to the second right end of the first member. A left/right pair of wheel dropouts is integrally located proximal to the second ends of the first member and ends of the bottom segment of the second member and adapted to receive the axle of the wheel.

The rigid third member, equivalent to a bicycle seat tube, has a first and second end wherein the first end is attached to the first end of the first member, and the second end is attached to the first end of the second member.

In various embodiments, one or more junctions between any of the members is rigid or fixed therefore pivotless. In at least one embodiment, all three junctions are pivotless.

In certain embodiments, the shock absorbing means is a long-travel, short-length shock absorber with angular deflection capability. In other embodiments, the shock absorbing means is a commercially-available bicycle shock absorber. Alternatively, an equivalent linkage may function as the shock absorbing means.

LIST OF REFERENCE NUMERALS

| 20 | main frame | 22 | rear frame |
|---|---|---|---|
| 24 | seat tube | 26 | front fork |
| 28 | front wheel | 30 | handlebars |
| 32 | seat | 34 | rear wheel |
| 36 | bottom bracket shell | 38 | pedal crankset assembly |
| 40 | pedal crankshaft | 42R | right crankarm |
| 42L | left crankarm | 44R | right pedal |
| 44L | left pedal | 46 | chainrings |
| 48 | chain | 50 | seatpost |
| 52 | axle of rear wheel | 54 | sprockets |
| 56 | rear derailleur | 58 | front derailleur |
| 60 | top tube | 62 | down tube |
| 64 | head tube | 66 | chainstay |
| 67 | tapering chainstay segment | 68 | dropout |
| 70 | seatstay | 71 | top seatstay segment |
| 72 | shock absorber | 74 | bottom seatstay segment |
| 76 | triangular aperture | 78 | straight beam |
| 80 | tapered beam | 82 | front attachment zone |
| 84 | front flex zone | 86 | middle zone |
| 88 | rear flex zone | 90 | rear attachment zone |
| 92 | upper boss | 94 | collar |
| 96 | pinch bolt | 98 | boot |
| 100 | shock body | 101 | lubrication port |
| 102 | upper stack | 104 | isolation spring |
| 106 | spacer | 108 | damper disc |
| 110 | inner sleeve | 112 | washer |
| 114 | center bolt | 116 | main spring disc |
| 118 | adjuster plug | | |

SUMMARY

The present invention provides a suspension system for a wheel, preferably for a bicycle rear wheel. The system comprises a generally flat, vertically flexible, bifurcated first member or chainstay structure connected to a compressible, bifurcated second member or seatstay structure. The upper, unitary portion of the seatstay incorporates a shock absorbing means, usually a shock absorber. In some embodiments the shock absorber has the capability of angular deflection as well as axial compression, and the chainstay has the capability of vertical deflection. In an embodiment, the flexible chainstay is rigidly attached to the main frame at a front end and is rigidly attached to seatstay at its rear ends. In an embodiment, the shock absorber is rigidly attached to the main frame at its forward and upper end and is rigidly attached to the bifurcated bottom segments at its rearward and lower end.

The aforementioned deflectional capabilities of the chainstays and shock absorber allow the suspension to move through its range of motion without requiring any rotational pivots. Furthermore, the deflectional capabilities of the chainstay and shock are approximately double what was heretofore available in this type of bicycle.

The suspension has several features which provide generous vertical wheel travel. First, the entire chainstay is made from solid thin plate. The vertical thickness of the flat plate chainstay is chosen so that the bending stress induced by vertical deflection is low. The cross-sectional distribution of material along the length of the chainstay is arranged to prevent buckling under chain loads, and distribute the bending stress uniformly across two large regions of the length of the chainstay. The front and rear ends of the chainstay have increased area to further reduce stresses in the attachment points.

In a preferred embodiment, the shock absorber is also optimized for maximum travel in a minimum length. It uses highly compressible elastomer elements for the springing and damping functions. The shock's range of motion allows the chainstay to flex both above and below its relaxed position, which increases travel. The elastomer's compression characteristics combine with the inherent resilience of the chainstay to produce a progressive spring curve.

The elastomer is divided into three portions, an undamped isolation spring portion, a friction damper portion with a lubrication port, and a damped main spring portion. This arrangement provides longer travel, with high efficiency, easy maintenance, good bump control, and improved isolation, all in a very short length.

The shock elastomer also serves as a linear bearing to control lateral movement of the suspension. Because it is flexible, the elastomer allows a small amount of angular deflection in the shock which obviates the need for a pivot on the shock, thus saving additional length, complexity, and weight.

The flat chainstay is designed to provide its considerable vertical travel with a minimum of lateral flex. In an embodiment, the structure for the chainstay provides high lateral strength and stiffness while remaining lightweight. This embodiment, when viewed from the top, presents a polygonal shape pierced by a plurality of triangular apertures. Methods for producing such shape and apertures are disclosed herein. The resulting structure is a planar truss, triangulated to resist lateral and longitudinal forces.

The two longitudinal portions of the chainstay have their material concentrated along their left and right sides, putting the material where it is needed to resist lateral loads. The front portion of the planar truss chainstay is arranged so that the load paths from each of the longitudinal portions spread across nearly the full width of the attachment to the frame, maximizing stiffness and strength. Preferably, the left side is wider to take advantage of the additional room available on the non-drive side.

Figure 1:
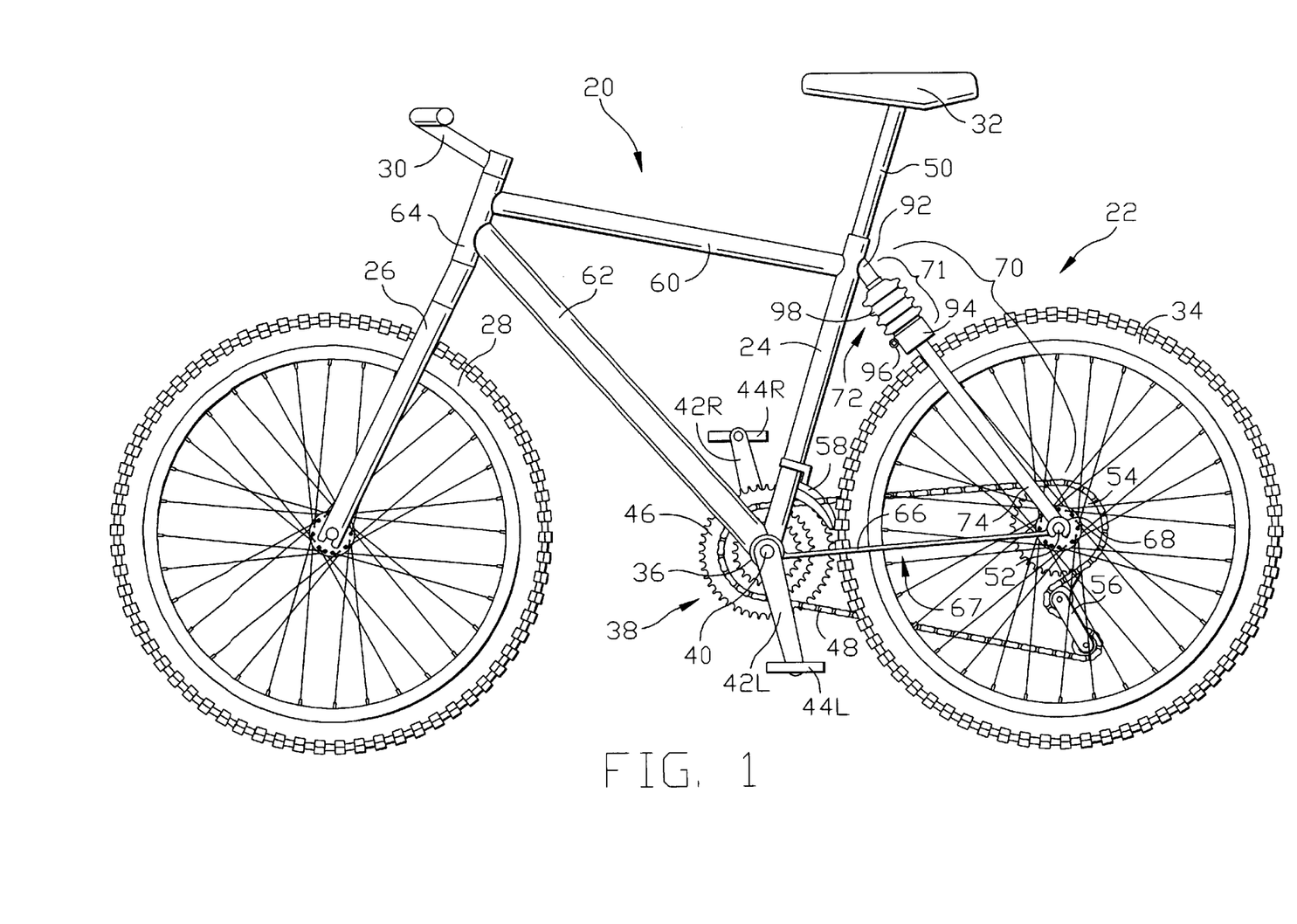
FIG. 1 is a side elevation view of a bicycle according to my invention.

General Description of the Preferred Embodiment of the Invention—FIG. 1

FIG. 1 shows a side elevational view of the preferred embodiment of a bicycle with a frame according to the instant invention. The frame has two parts, a main portion 20 customarily called the front triangle (although it normally has four tubes) and a rear frame portion 22, known as the rear triangle. Both triangles share a common side formed by a seat tube 24. Frame portions 20 and 22 will be described in detail below. A front fork 26 is mounted to the front of main frame portion 20 on bearings, not shown, to allow the bicycle to be steered, in a manner well known in the art. A front wheel 28 and a set of handlebars 30 are attached to fork 26 in the conventional manner. Fork 26 may incorporate a front wheel suspension, not shown, if desired. A seat 32 is secured to the upper portion of seat tube 24.

Rear frame portion 22 extends rearwardly from main frame portion 20 and seat tube 24. A rear wheel 34 is mounted to the rearmost apex of the rear frame portion. The front and rear wheels rotate conventionally, i.e., parallel to an imaginary, vertical, fore-and-aft plane when the bicycle is traveling in a straight line.

At the bottom end of seat tube 24 is a bottom bracket shell 36 which is adapted to receive a pedal crankset assembly 38. Pedal crankset assembly 38 comprises a pedal crankshaft 40, a pair of crankarms 42R (right) and 42L (left) a pair of foot pedals 44R and 44L, and one or more chainrings 46. Chainrings 46 engage a continuous chain 48 to drive rear wheel 34, as is common in the art. Pedal crankshaft 40 rotates on bearings, not shown, within bottom bracket shell 36.

Seat tube 24 extends upwardly and rearwardly from bottom bracket shell 36 and slidably engages a seatpost 50, as is common practice. Seat 32 is fixed atop the seatpost.

Rear wheel 34 rotates on a rear axle 52 which is secured to rear frame portion 22. Mounted to the rear wheel are a plurality of successively larger sprockets 54, only one of which is shown, to engage chain 48. The sprockets are mounted on a freewheel or one-way clutch, not shown, to allow coasting. A rear derailleur 56 and a front derailleur 58 shift chain 48 to select the drive ratio or gear. A derailleur type system is depicted here because it is the most common, although a different type of drive system may be employed with my suspension system.

Other miscellaneous parts of the bicycle are well known, commonly available, and not directly relevant to the instant invention. Therefore they are omitted for clarity.

Main Frame Portion—FIG. 1

In FIG. 1, main frame portion 20 comprises a top tube 60, a lower or down tube 62, a head tube 64, seat tube 24, and bottom bracket shell 36. Top tube 60 is positioned longitudinally, forming the top of main frame 20. The forward end of top tube 60 is attached to head tube 64, which carries the bearings for front fork 26. Below the top tube, down tube 62 extends downwardly and rearwardly from head tube 64 to bottom bracket shell 36. Seat tube 24 is attached at its bottom to bottom bracket shell 36, and is attached near its upper end to the rear end of top tube 60.

Main frame 20 resembles the forward part, or front triangle, of a conventional unsuspended bicycle. Thus any method of construction suitable for bicycles may be used to assemble the frame. However all tubes are preferably metallic tubing, rigidly welded together at the junctions.

Rear Frame Portion—FIG. 1

It is here that the unique elements of the instant invention lie. Continuing with FIG. 1, rear frame portion 22 is a generally triangular structure comprising a nearly horizontal chainstay 66 with a bifurcated pair of generally tapering segments 67, a wheel mount or dropout 68 at the rearmost apex of the triangle, and an inclined strut or seatstay 70, all attached behind seat tube 24. The seatstay has a unitary top segment 71 and a pair of bifurcated bottom segments 74.

Preferred chainstay 66 forms the first member of triangular rear frame portion 22. The chainstay is slender in side view, which allows it to be vertically flexible, as will be discussed in detail below. Describing from the forward end, chainstay 66 is rigidly attached, preferably by welding, to bottom bracket shell 36. The chainstay forks or bifurcates to pass longitudinally alongside the rear wheel, and is rigidly attached to dropout 68, preferably by welding. The dropout is conventionally adapted to receive rear axle 52. The dropout on the right side (not shown) is also conventionally adapted to attach rear derailleur 56.

The second member of the rear triangle is strut 70, which forms an acute angle with the chainstay member. Seatstay 70 spans between dropout 68 and main frame 20 and is rigidly attached to both, preferably by welding. Seatstay 70 comprises unitary top segment 71, which integrates an axially compressible shock absorber 72, connected to both arms of a bifurcated tubular bottom segment 74 (only left side shown). A conventional bicycle braking system (not shown) may be attached to the seatstays. Further details of the shock absorber and seatstay will be presented later.

In the preferred embodiment the third member of the rear triangle is the seat tube 24—the common element between the front and rear frame portions. However the seat tube and main frame portion may be replaced by a differently shaped equivalent structure without departing from the scope of the instant invention.

General Operation of the Invention—FIG. 1

The overall operation of the suspension is straightforward. Generally when rear wheel 34 encounters a bump, shock absorber 72 is compressed and chainstay 66 is urged upward into a flexed position. Similarly when the rider unweights or dismounts, the shock absorber fully extends and urges the chainstay into a downwardly flexed position.

The purpose and function of the parts comprising main frame 20, including seat tube 24, top tube 60, down tube 62, and head tube 64 are well known in the art, and are not discussed further, except as they relate directly to my suspension.

Similarly, the purpose and function of standard parts, such as fork 26, front wheel 28, handlebars 30, seat 32, pedal crankset assembly 38 (including crankshaft 40, crankarms 42R and 42L, pedals 44R and 44L, and chainrings 46), chain 48, seatpost 50, sprockets 54, derailleurs 56 and 58, are also well known.

Figure 2:
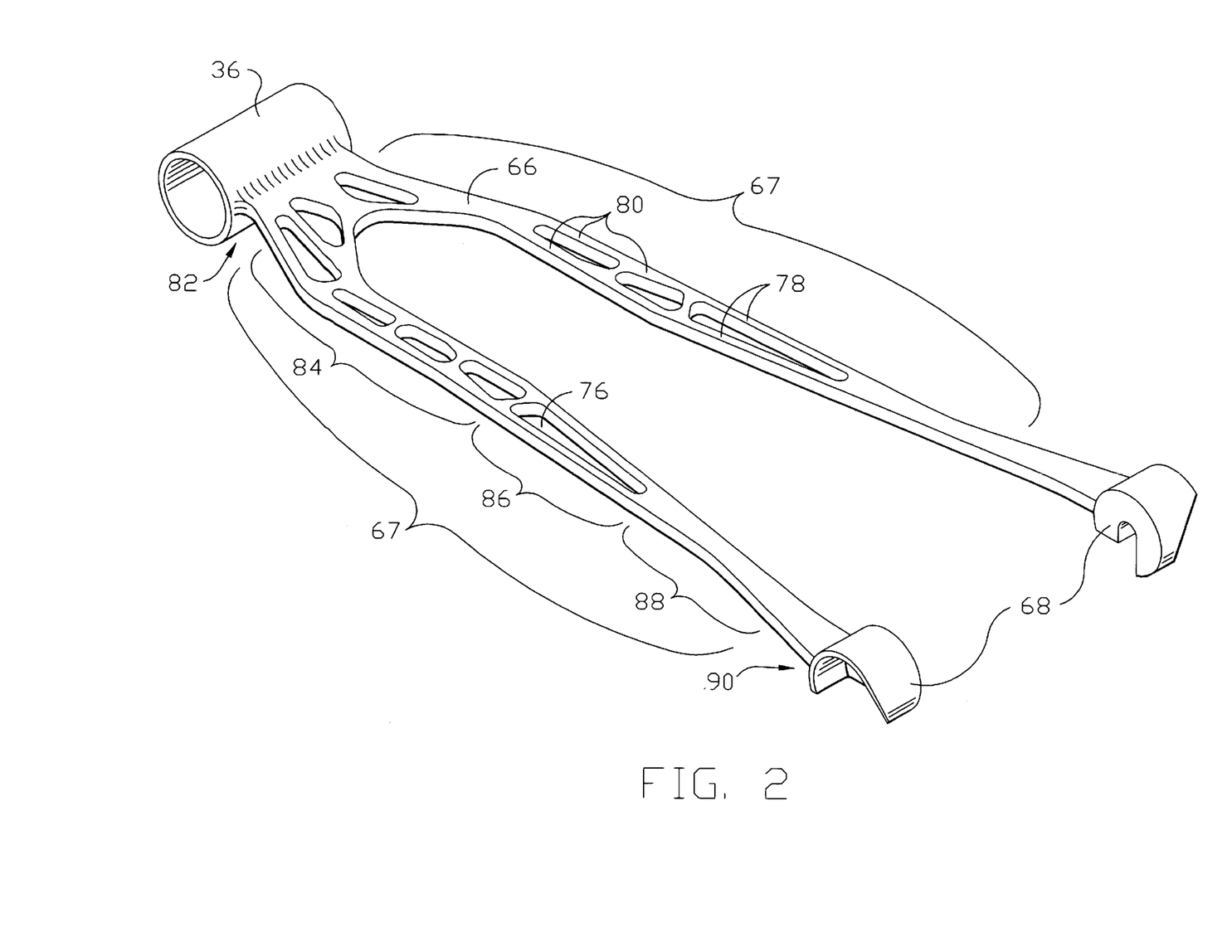
FIG. 2 is an isometric view of a preferred form of chainstay used in this bicycle.

Description of the Preferred Chainstay—FIG. 2

FIG. 2 is an isometric view of preferred chainstay 66, as attached to bottom bracket shell 36 and dropouts 68. The chainstay is preferably fabricated from flat metal plate such as aluminum or another metal or, most preferably, titanium of a thickness between 0.4 to 1.3 cm, more preferably 0.5 to 1 cm, most preferably 0.64 cm. The thickness requirements for aluminum are the same. Other materials such as composites, plastics, or other metals may be used as long as the thickness is sufficient to preclude gross buckling, yet thin enough to accommodate the desired wheel travel without exceeding the fatigue strength of the material. This may be analyzed by computer as described later.

The plate chainstay extends the full length between the bottom bracket shell and the dropouts. The cross section is generally thin vertically and relatively wide horizontally, to allow vertical flex while resisting lateral flex. At its widest point (the front), the preferred chainstay is between 2.5 and 6.0 cm wide, most preferably approximately 5.5 cm wide. At its narrowest point (towards the rear) the preferred chainstay is between 0.75 and 1.5 cm wide, most preferably 1.0 cm wide.

The outline of chainstay 66 is formed to an irregular polygonal shape which circumvents the rear tire, the crankarms, and the chainrings (not shown in this view). In the most preferred embodiment, chainstay 66 is pierced by ten generally triangular apertures, such as aperture 76. The outline shape and the apertures combine to form a plurality of beam segments, such as straight beam 78 and tapered beam 80, which make up a laterally stiff truss framework.

To increase the vertical flexibility, the edges of the chainstay and apertures are positioned so that the width and cross-sectional area of the chainstay vary in a predetermined manner along its length. The length of chainstay 66 can be divided into five contiguous zones:

A front weld or attachment zone 82 is the wide region immediately adjacent where the chainstay is attached to bottom bracket shell 36. The front attachment zone extends across nearly the full width of the bottom bracket shell to increase the area and width of the attachment. If the chainstay is to be welded, it is welded all the way around its top, side, and bottom surfaces.

A front flex zone 84 occupies the rest of the forwardmost third of the chainstay. Its cross-sectional sectional area generally decreases towards the rear. The chainstay forks in this zone to go around the rear wheel. The right side of the front flex zone is narrower than the left side in order to clear the chainrings present on the right side. However, due to the two additional apertures on the left side, as compared to the right, the cross-sectional area is substantially identical on both sides.

A middle zone 86 is relatively wider to take advantage of the extra room available behind the rear tire and to resist buckling under compressive chain loads.

A rear flex zone 88 has a relatively narrow waist with relatively smaller area.

A rear weld or attachment zone 90 widens to increase the area where chainstay 66 is attached to dropout 68. The dropout is correspondingly wide where it meets the chainstay. Here also, the chainstay may be welded all the way around its top, side, and bottom surfaces (the weld is hidden in this view).

There are no distinct dividing lines between these five chainstay zones, but each functions differently as will be explained in the operation section below.

Fabrication of Chainstay—FIG. 2

Chainstay 66 can be fabricated by several methods. For example, the shape can be die cut from a wrought or extruded plate, or cut using a milling machine, a cutting laser, or a waterjet cutter. The latter three machines are typically computer controlled for accuracy and economy. The preferred method uses a computer-controlled waterjet cutting machine, which ejects a jet of slurry composed of water and abrasive particles through a ceramic nozzle under high pressure to cut the titanium plate to a predetermined shape. This method is preferred because it produces minimal residual stress and no heat-affected zone.

Operation of Chainstay—FIGS. 1 and 2

In the most preferred embodiment, several features of chainstay 66 combine to simultaneously achieve improved vertical flexibility and travel with improved lateral rigidity. This reduces or eliminates the need for mechanical pivot elements. Briefly, the full-length-plate chainstay is thin vertically. It has a wide shape, especially towards the front and on the left side. Special apertures 76 increase vertical flexibility, and lighten the bicycle, while maintaining lateral stiffness. These and other factors amplify the lateral stiffness and vertical flexibility of the chainstay. Several features can be combined to achieve a significant increase in performance over prior bicycles:

Thin Titanium Plate Material: First, the preferred chainstay is made from a thin, wide titanium plate. For a given deflection, bending stress is proportional to thickness. Thus the thinness of chainstay 66 reduces the stress considerably. Furthermore, the flat top and bottom surfaces produce a "flat" stress distribution, constant from left to right, which utilizes the material more effectively. Also, the preferred titanium material is very resilient, with a low modulus of elasticity and high strength. These three factors provide a good basis for increased travel.

Built at ride height: The frame is built at ride height, meaning that when the rider is on the bike, and the shock absorber is partially compressed, chainstay 66 is not flexed. In use on rough terrain, the chainstay flexes both up and down from its flat, unstressed position. When rear wheel 34 encounters a rock and shock 72 compresses, the forward portion of the chainstay assumes a concave-up curvature, allowing the wheel to rise. Because the shock allows only axial motion, the rearward portion of the chainstay is forced into a concave-down curvature. This double curvature can be appreciated by grasping the ends of a flexible ruler and moving one end up relative to the other. When the rider dismounts, the shock extends to fill length forcing the chainstay to curve in the reverse direction—concave down in the front and concave up in the rear. Allowing chainstay 66 to flex both directions from its relaxed position allows increased travel and also maximizes lateral stiffness by minimizing the curvature of the chainstay plate when the rider is on the bicycle.

Resilient Chainstay: The resilient linear-spring characteristics of chainstay 66 combines with the progressive shock absorber characteristics to produce a mildly progressive combined spring-rate curve. Also, because the chainstay is flexed when fully extended, the chainstay functions to assist in initial compression of the shock, acting as a so-called negative spring and improving small bump absorption.

Full Length, Pivotless: The flexible plate extends the full length from bottom bracket shell 36 to rear wheel dropouts 68, which gives two long flex zones (84 and 88) and no heavy pivots to wear out. Also, because preferred chainstay 66 is rigidly attached at zones 82 and 90, there are no fasteners to loosen or break.

Intersecting Load Path, Wide Attachment Zones: The frontmost portion of left and right chainstay segments 67 widens as it approaches front attachment zone 82. In the most preferred embodiment, each segment widens to nearly the full width of bottom bracket shell 36 and intersects each other. This spreads the lateral loads over a width of 5 cm, stiffening the chainstay member and decreasing weld stress. The intersecting region may have a welded seam to allow the chainstay to be more economically produced. In another embodiment, the left and right members each widen to half the width of the bottom bracket shell, but do not intersect. This would be useful, for example, to clear a larger diameter wheel. In this embodiment, lateral loads are spread over a width of 2.5 cm or more. Rear attachment portions 90 of the chainstay also widen as they approach dropouts 68 to reduce stress in rear attachment zone 90. In all of these embodiments, the area increases towards the attachment zones to reduce stresses there. Although only welded embodiments have been described, any other method of attachment suitable for bicycle construction may be utilized. For example, the chainstay member may be bonded to the bottom bracket shell and/or dropouts, or molded as a unitary piece, or even bolted.

Favorable Joint Configuration: The weld fillets of the most preferred embodiment extend all the way around the attachment zones to smoothly defuse stresses. Conversely, when a hollow tubular chainstay is welded around the outside of the tube at the joint, it creates a sharp corner around the inside, which causes a large stress concentration in the joint. The preferred solid (not hollow) chainstay 66 of the instant invention produces no such corner or stress concentration.

Rear Flex Zone: Approximately 8 cm forward of rear attachment zone 90, both left and right chainstay segments 67 taper down to a width of approximately 1 cm. This "wasp waist" shape provides a zone of reduced area, leading to increased vertical flexibility in that zone. This rear flex zone 88 accommodates the relative angular motion between the chainstay and the seatstay to minimize stress at the rear attachment.

Asymmetrical: In the most preferred embodiment, the front of left chainstay segment 67 has a wider lateral dimension than the right segment. The right segment must be narrow because of the presence of the chainrings, however, the left side is wider to take advantage of the wider space available and gain lateral rigidity. Although the left side is wider, it has approximately the same cross-sectional area as the right side by virtue of two additional apertures present on the left side. Having the same area on both sides provides consistent vertical flex characteristics between the two sides.

Planar Truss: A planar truss is a structure in which the members form adjoining triangles lying in a plane. In a planar truss, the members take primarily tension and compression loads with a minimum of bending moments. In the preferred embodiment, the polygonal outline and triangular apertures 76 combine to produce what is, in effect, a planar truss. Almost all the material is on the sides of the members, with proper bracing between the sides, for maximum stiffness.

Front Flex Zone: When the suspension deflects vertically, the associated bending moment decreases towards middle zone 86 of the chainstay. The triangular apertures in front flex zone 84 are shaped so that the cross-sectional area of tapered beams 80 varies approximately in proportion to the bending moment, to disperse the stress over a larger area. This utilizes the material more effectively and increases deflectional capabilities. Specifically, the left and right sides of tapered beams 80, if extended to the rear, would intersect in middle zone 86 of the chainstay where the bending moment approaches zero.

Beams Aligned With Load: In the embodiment of FIG. 2, the shape of the outline of chainstay 66 combines with the shape of rearmost aperture 76 to produce straight beams 78. For strength and rigidity, it is critical that the axes of these beams intersect very close to the inboard surfaces of dropouts 68, where loads from wheel axle 52 (not shown) are applied. However, in another embodiment, the rearmost aperture can be omitted for increased buckling strength under chain loads, e.g., if the chainstay is made out of aluminum instead of titanium.

FEA-Optimized: Computer modeling provides a practical way to rapidly optimize a structure. The Finite Element Analysis (FEA) method is commonly used in industry to identify areas of low stress and high stress. Material which is lightly stressed under all loading conditions is dead weight and can be removed to save weight. Areas which are highly stressed are strengthened by increasing section size or the radii of inside corners. This method was used to optimize the preferred embodiment of chainstay 66 shown in FIG. 2. FEA was also used to verify that the thickness and area of the preferred embodiment were sufficient to prevent gross buckling under expected chain loads. Any alternative embodiment should be similarly analyzed. Of course, any proposed design must also be durability-tested before production.

Synergism: The net result of the combination of the above-described features of the most preferred embodiment is an improvement in the ratio of lateral stiffness to vertical stiffness by an order of magnitude. That is, preferred chainstay 66 is 10 times as stiff laterally as it is vertically, compared to equal lateral and vertical stiffnesses for a round-tube chainstay. Alternate embodiments which combine some but not all of the above-described features offer a lesser but still significant improvement. For example, early prototype embodiments with a lateral to vertical stiffness ratio as low as approximately 5:1 still provided a significant improvement in performance over a round-tube chainstay.

Description of Seatstay—FIG. 1

Seatstay 70 is a compressible strut with unitary top portion 71 and bifurcated bottom segments 74. Top portion 71 comprises a threaded upper mount or boss 92, shock absorber 72, and a slotted lower mount or collar 94 with a pinch bolt 96. Boss 92 is preferably welded to main frame 20. Shock absorber 72 is attached by threading into the underside of boss 92 (threads not shown). Part of upper boss 92 and shock absorber 72 are covered by a flexible convoluted boot 98. The lower end of shock 72 is clamped inside slotted collar 94 by pinch bolt 96, as is common in bicycles, for example, in seatpost binders. Lower segments 74 connect collar 94 to dropout 68, preferably by welded joints.

Figure 3:
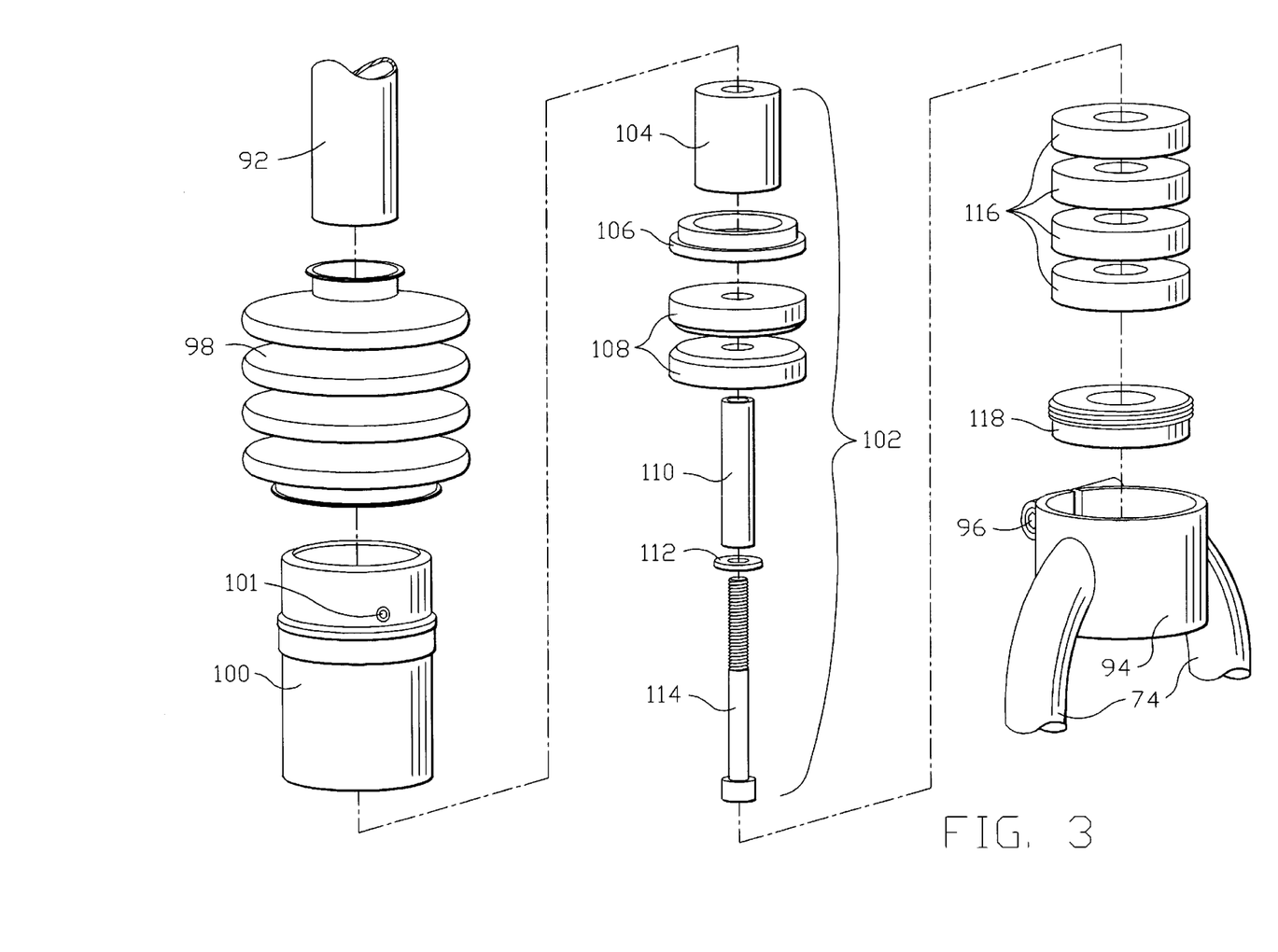
FIG. 3 is an exploded view of a preferred shock absorber.

Description of Shock—FIG. 3

FIG. 3 shows an exploded view of shock absorber 72 according to a preferred embodiment. The internal parts of shock 72 operate inside a shock body 100, preferably made from hard-anodized aluminum. The space between shock body 100 and boss 92 is sealed by flexible boot 98. Body 100 has two or more lubrication ports 101 through its wall to allow injection of grease. The spring elements are made from microcellular polyurethane (MCU), an elastomeric material which is volume-compressible by virtue of many tiny closed gas cells within the material. The stiffness of the spring elements may be changed by selecting a material with higher or lower density, but preferably, the density is within the range of 0.5 to 0.7 g/cc.

Describing from top to bottom, an upper stack 102 comprises an MCU isolation spring 104, a plastic spacer 106, two MCU damper discs 108, a steel inner sleeve 110, a washer 112, and a center bolt 114. Below upper stack 102, is a stack of four MCU main spring discs 116, and an aluminum adjuster plug 118.

Shock 72 is assembled as follows: Body 100 is clamped in collar 94 by tightening pinch bolt 96. Boot 98 is slid onto boss 92 and body 100. Then upper stack 102 is assembled: Bolt 114 is passed through washer 112 and inner sleeve 110. Inner sleeve 110 is pushed through damper discs 108, spacer 106, and isolation spring 104. Upper stack 102 is then inserted through bottom of body 100 and bolt 114 is threaded into boss 92 until tight. Next, the stack of main spring discs 116 is inserted, and adjuster plug 118 is threaded into body 100 and preloaded against main spring discs 116. The inside of the body 100 has a lip or reduced diameter segment (not shown) at the top to limit the extension of the shock.

Operation of Shock and Seatstay—FIGS. 1 and 3

As can be appreciated from FIG. 1, when the wheel moves upward in response to a bump it urges the seatstay, and hence the shock, to compress. To take maximum advantage of the flexibility of the preferred chainstay requires a shock with long travel.

Long Travel in a Short Length: The preferred embodiment of shock absorber 72 provides long travel in a short length. To do this, it uses highly compressible MCU elastomer elements for the springing and damping functions. The shock elastomer elements also serve as a linear bearing to control lateral movement of the suspension while allowing for a small amount of angular deflection of the seatstay bottom segment 74 in the plane of the wheel. The angular deflection capability obviates the need for a pivot and allows the shock to be rigidly mounted to the frame, thus saving additional length.

Referring now to FIG. 3, the elastomer is divided into three portions, an undamped portion, namely isolation spring 104; a friction damper portion made up of damper discs 108; and a damped main spring portion made up of main spring discs 116. When the shock absorber is slightly compressed, isolation spring 104 deforms axially and absorbs the initial compression. As the shock absorber is compressed further, damper discs 108 begin to slide axially inside shock body 100, in turn compressing main spring discs 116.

Inner sleeve 110 serves to guide and position isolation spring 104 and damper discs 108. Center bolt 114 fastens sleeve 110 to boss 92. Washer 112 retains damper discs 108, spacer 106 and isolation spring 104 on sleeve 110.

Progressive Damping: The two elastomeric damper discs together form the principal element of shock 72. Damper discs 108 perform their damping function through sliding friction between their outer diameter and the inside surface or inner wall of shock body 100. Damper discs 108 are made from commercially available MCU sheet material, which is ground to an outer diameter approximately 0.025 cm larger than the inside diameter of shock body 100. This creates an interference fit, which causes friction when there is relative sliding motion between discs 108 and body 100. As the compression force increases due to increasing compression of the shock, the damper discs bulge harder against the inner surface of body 100 increasing the pressure and the friction. This has the advantage of providing damping force which increases progressively, in approximate proportion to the size of the bump.

Improved Isolation: For small motions of shock 72, such as the small motions due to pedaling action or small bumps, damper discs 108 do not slide, but instead stick in one place inside body 100. Such small motions are accommodated entirely by isolation spring 104. Thus small motions due to pedaling are undamped, which improves isolation from small high-frequency bumps and also prevents the rider's valuable pedaling energy from being absorbed by the shock absorber.

Lubrication System: For ease of maintenance, a lubrication system is preferably employed. As seen in FIG. 3, damper discs 108 have a chamfer on one end of the outer diameter. When the dampers are installed adjacent each other, these chamfers form an annular groove. Body 100 contains at least two lubrication ports 101 through the wall of the body 100. Only one port can be seen in the figure, another is active preferably diametrically opposed. The ports line up with the annular groove and allow a lubricant (not shown) to be injected. Lubricant spreads from the groove and is carried by the open cells on the ground outer diameter of the damper discs 108 to reduce wear and provide smooth sliding action. A polyurethanecompatible grease lubricant is preferred, such as silicone-based grease. The lubrication port is covered by boot 98 to keep it clean when the bicycle is in use.

Damped Main Spring: Main spring discs 116 are, in turn, compressed and damped by damper discs 108. Main spring discs 116 are similar to damper discs 108 except that they have a larger inside diameter and a smaller outside diameter. The inside diameter is sized to allow the bolt 114 head and washer 112 to freely pass through as the shock is compressed. The outside diameter is approximately 0.025 cm smaller than the inside diameter of the shock body 100. When partially compressed, the main spring discs 116 bulge until they touch the body 100. When further compressed, they contribute to the damping friction provided by the damper discs 108. The large area of the friction surfaces keeps wear to a minimum. Also, the long axial length of the frictionally engaged surfaces produces gradual changes in damping force, contributing to a smooth feel.

Main spring discs 116 are held in place axially by adjuster plug 118 which is threaded into the lower end of shock body 100 and serves as a bottom casing for the main spring. The upper surface of plug 118 contains a recess to accommodate the head of bolt 114 under extreme compression. The underside of adjuster (not shown) is adapted to receive a wrench. Preload and ride height may be adjusted for different riders by screwing the adjuster in or out.

Anti-Resonance: As mentioned, small motions are absorbed solely by isolation spring 104, which by itself is stiffer than the entire stack is. Thus the resonant or natural frequency of the suspension is relatively high for small motions. Preferably the suspension resonance is at a higher frequency than the normal pedal pulses produced by the rider. However if the rider engages in vigorous pedaling at a sufficiently fast rate, such that the suspension starts to resonate, then the damper discs begin to slide up and down in body 100. This has two effects; first the resonance is damped out by the sliding friction and, secondly, the resonant frequency is now relatively much lower due to the softer spring rate when the whole stack is. The lower resonant frequency does not match the high rate of pedaling, so sympathetic resonance is substantially avoided.

Linear Bearing with Angular Capability: In addition to their damping function, damper discs 108 also serve as a linear bearing which resists side forces on shock while allowing axial motion. Such side forces can arise, for example, from braking loads or from torsional loads on the frame. If shock body 100 is pushed sideways, the force is transferred radially through damper discs 108 to inner sleeve 110 and main frame portion 20.

In use, when rear wheel 34 moves upward and shock absorber 72 compresses, the bottom segment 74 of seatstay 70 rotates slightly within the plane of the wheel (counterclockwise in FIG. 1). Conventional shocks require a pivoting eyelet to accommodate this rotation. However, because damper discs 108 are made from elastomeric material, they are somewhat flexible radially. Thus they function as a linear bearing which is tolerant of angulation deflection between the ends of the shock. That is, inner sleeve 10 and shock body 100 can be approximately 2 to 5 degrees out of coaxial alignment and the misalignment will be accommodated by flexing of the discs without causing binding or undue stress on any of the parts. This allows the shock to be rigidly attached to the frame without needing any pivoted eyelets.

The functions of spacer 106 are to spread the compression load from isolation spring 104 to damper discs 108, and to limit sideways deflection of the shock. Spacer 106 is made from plastic such as acetal and normally has clearance to inner sleeve 110 and shock body 100. Under extreme sideways load, the clearance vanishes and the spacer 106 makes contact with inner sleeve 110 and body 100 and resists further deflection.

Summary of Preferred Shock Absorber: In short, this shock absorber arrangement provides longer travel, with high efficiency, easy maintenance, good bump control, and improved isolation, all in a very short length. In fact, this shock absorber is capable of compressing to approximately one half of its uncompressed length. This is about twice as much as any commercially available shock. The preferred embodiment of the shock absorber is capable of providing between approximately 2.5 to 5 cm shock travel within a shock absorber length of 5 to 10 cm. This corresponds to a wheel travel of between 3 and 6 cm.

In the preferred embodiment, shock absorber 72 is rigidly attached to the main frame at its forward end and is rigidly attached to the bifurcated bottom segments at its rearward end. The aforementioned deflectional capabilities of the chainstays and shock absorber allow the suspension to move through its range of motion without requiring any rotational pivots.

The shock's range of motion allows the chainstay to flex both above and below its relaxed position, which increases travel. The elastomer's compression characteristics combine with the inherent resilience of the chainstay to produce a progressive spring curve. The progressive (steepening) spring curve provides good small bump isolation with bottoming resistance.

Isolation spring 104 blocks high frequency vibrations which cause rider fatigue. It also decouples the frictional damping forces from the frame so the rider does not feel any static friction, known as stiction.

The shock absorber characteristics can be changed or tuned for different riders or rider preference by changing the density of the MCU elements, or by changing the diameter or length of shock absorber 72, by changing the amount of interference fit between damper discs 108 and body 100, or simply by adjusting the preload with plug 118.

Although the preferred principal elastomeric damping element is described as being made of two damper discs 108, it can alternatively be molded as one piece. Similarly, the four main spring elements 116 can be molded as a single piece. Additionally, isolation spring 104 may be incorporated into the damping element. The entire elastomeric stack may even be molded as one piece for economy while still performing the functions described above.

CONCLUSIONS, RAMIFICATIONS, AND SCOPE

In summary, this is the first bicycle suspension system to solve all the typical problems of prior pivotless designs. It provides a bicycle which is laterally and torsionally stiff, vertically flexible, low maintenance, durable, reliable, comfortable, compact, aesthetically appealing and lightweight.

While my above description contains many specificities, these should not be construed as limitations on the scope of the invention, but rather as an exemplification of preferred embodiments.

In addition to the embodiments already described, there are other minor variations in design and construction which may be embodied without departing from the full scope of the invention.

Many variations in the design of main frame 20 are possible. For example, the main frame can combine top tube and seat tube into a single structure. It can be a hollow shell made from shaped sheet metal or composites. The main frame may even incorporate an integral front suspension system.

Although a completely pivotless preferred embodiment has been described, alternative embodiments are possible which have some pivots, but fewer pivots than prior bicycle suspensions. For example, any commercially available bicycle shock absorber, which uses a pivot to accommodate the angular deflection, may be used with the preferred chainstay. Suitable models would be the Air Vanilla shock absorber made by Fox Racing Shocks of Watsonville Calif., or the S.I.D. shock absorber sold by Rock Shots of Colorado Springs Colo. They could even be used in a pivotless configuration, but they would wear quickly from the angular misalignments.

Alternatively, the preferred pivotless shock absorber described herein may be used to advantage with a conventional pivoted chainstay.

The shock absorber may be inverted, or placed in an alternative location such as immediately in front of the seat tube, or may incorporate a linkage to multiply the travel.

The chainstay may be inclined in a nose-up attitude to reduce pedaling-induced bobbing, and it may have thicker portions away from the flex zones. The dropout design may be different as long as the attachment to the chainstay is stiff and strong. The chainstay apertures may be replaced by pockets, or eliminated altogether.

Accordingly, the scope of the invention should be determined not by the embodiments illustrated, but by the appended claims and their legal equivalents.

I claim:

1. A suspension system for a rotatable wheel vertically mounted in a frame, wherein said wheel has a horizontal axle aligned perpendicular to the plane of the wheel and the frame has a triangular wheel suspension component comprising:
   a) a first solid member with a long axis, a wide lateral side, and a relatively thin vertical side, said member being substantially more rigid laterally than vertically, said first member having a solid wide first end, and a bifurcated left/right pair of tapering segments adapted to receive the wheel, the segments having left and right second ends, said first member being solid from said first end to said left and right second ends;
   b) a second strut member, with a long axis, longitudinally expandable and compressible, comprising a unitary top segment with a first end and an integrated shock absorbing means adapted to dampen the longitudinal movement, and a bifurcated left/right pair of bottom segments adapted to receive the wheel, the bottom segments having left and right second ends, wherein said second left end of said second member is attached to said second left end of said first member and said second right end of said second member is attached to said second right end of said first member, and a left/right pair of wheel dropouts is integrally located proximal to the second ends of the first member and second ends of the second member and adapted to receive the axle of the wheel; and
   c) a rigid third member with a first and second end wherein said first end is rigidly attached to said first end of said first member, and said second end is attached to said first end of said second member.

2. The suspension system of claim 1 wherein the attachments of the bottom left end of said second member to said second left end of said first member, and the bottom right end of said second member to the second right end of the first member, and the second end of the third member to the first end of the second member are each rigid attachments.

3. The suspension system of claim 1 wherein the first member contains five longitudinally contiguous zones, a front attachment zone located adjacent to the junction with the third member, a front flex zone located adjacent to and rearward from the front attachment zone, a middle zone adjacent to and rearward from the front flex zone, a rear flex zone adjacent to and rearward from the middle zone and a rear attachment zone adjacent to and rearward from the rear flex zone and also adjacent to the junction of the first and second members, said zones having different lateral dimensions such that front and rear flex zones are more vertically flexible than their adjacent attachment zones.

4. The suspension system of claim 1 wherein the first member contains a multiplicity of apertures through the lateral side.

5. The suspension system of claim 4 wherein the apertures are generally triangular.

6. The suspension system of claim 5 wherein the first member contains five longitudinally contiguous zones, a front attachment zone located adjacent to the junction with the third member, a front flex zone located adjacent to and rearward from the front attachment zone, a middle zone adjacent to and rearward from the front flex zone, a rear flex zone adjacent to and rearward from the middle zone and a rear attachment zone adjacent to and rearward from the rear flex zone and also adjacent to the junction of the first and second members, said zones having different lateral dimensions such that front and rear flex zones are more vertically flexible than their adjacent attachment zones.

7. The suspension system of claim 6 wherein lateral dimensions from the long axis of the first member are asymmetrical.

8. The suspension system of claim 1 wherein the shock absorbing means of the second member substantially eliminates torsional flex of the first member.

9. The suspension system of claim 1 wherein said first member has a multiplicity of longitudinal zones wherein at least one zone has a linearly decreasing or increasing cross-sectional area.

10. The suspension system of claim 1 wherein said first member contains at least one concave pocket in the lateral side.

11. The suspension system of claim 1 wherein the attachments of the second left end of said second member to said second left end of said first member, and the second right end of said second member to the second right end of the first member are each rigid attachments.

12. A suspension system for a rotatable wheel vertically mounted in a frame, wherein said wheel has a horizontal axle aligned perpendicular to the plane of the wheel and the frame has a triangular wheel suspension component comprising:
   a) a first member having a first end, and a bifurcated left/right pair of segments adapted to receive the wheel, the segments having left and right second ends,
   b) a second strut member, with a long axis, longitudinally expandable and compressible, comprising a unitary top segment with a first end and an integrated long travel short length shock absorber with angular deflectional capability adapted to dampen the longitudinal movement, and a bifurcated left/right pair of bottom segments adapted to receive the wheel, the bottom segments having left and right second ends, wherein said second left end of said second member is attached to said second left end of said first member and said second right end of said second member is attached to said second right end of said first member, and a left/right pair of wheel dropouts is integrally located proximal to the second ends of the first member and second ends of the second member and adapted to receive the axle of the wheel; and c) a rigid third member with a first and second end wherein said first end is attached to said first end of said first member, and said second end is rigidly attached to said first end of said second member;

said shock absorber comprising a principal elastomeric element within a shock body wherein the principal element is affixed to the top portion of the strut by a shaft passing through a central bore in the element and fixedly attached to the top portion of the strut, and the body being rigidly attached to the bifurcating bottom segments of the second member and having an inner wall and bottom casing with a central bore to accommodate said shaft, and the body slidably enveloping the principal element creating an interference fit between the shock body and the element, thereby providing a linear bearing that accommodates angular deflection;

and, when the strut is compressed, the bottom casing acts upon the principal element providing a damped spring action.

13. The suspension system of claim 12 wherein the first member contains five longitudinally contiguous zones, a front attachment zone located adjacent to the junction with the third member, a front flex zone located adjacent to and rearward from the front attachment zone, a middle zone adjacent to and rearward from the front flex zone, a rear flex zone adjacent to and rearward from the middle zone and a rear attachment zone adjacent to and rearward from the rear flex zone and also adjacent to the junction of the first and second members, said zones adapted to different lateral dimensions such that front and rear flex zones are more vertically flexible than their adjacent attachment zones.

14. The suspension system of claim 12 wherein the first member contains a multiplicity of apertures through the lateral side.

15. The suspension system of claim 14 wherein the apertures are generally triangular.

16. The suspension system of claim 15 wherein the first member contains five longitudinally contiguous zones, a front attachment zone located adjacent to the junction with the third member, a front flex zone located adjacent to and rearward from the front attachment zone, a middle zone adjacent to and rearward from the front flex zone, a rear flex zone adjacent to and rearward from the middle zone and a rear attachment zone adjacent to and rearward from the rear flex zone and also adjacent to the junction of the first and second members, said zones adapted to different lateral dimensions such that front and rear flex zones are more vertically flexible than their adjacent attachment zones.

17. The suspension system of claim 10 wherein lateral dimensions from the long axis of the first member are asymmetrical.

18. The suspension system of claim 12 wherein the shock absorber of the second member substantially eliminates torsional flex of the first member.

19. The suspension system of claim 12 with progressive compression damping, comprising:

a) an undamped elastomeric component above and adjacent to the principal element, the component being affixed to the top portion of the strut by the shaft which passes through a central bore in the component; and b) an elastomeric main spring element with a central bore adapted to accommodate said shaft, said main spring fitted inside the shock body below the elastomeric element, and adapted to press radially against the inner wall of the shock body, such that, when the strut is initially compressed the undamped component deforms axially absorbing the initial compression, and as the strut is compressed further, the principal element is increasingly deformed laterally thereby progressively damping axial movement of the strut as a result of the increasing frictional interaction of the damper disc and the shock body, and such that still further compression laterally deforms the main spring, additionally damping strut compression as a result of the frictional interaction of the main spring and the shock body.

20. The suspension system of claim 12 wherein at least one of said attachments to said ends of said first member is a rigid attachment.

21. A suspension system for a rotatable wheel vertically mounted in a frame, wherein said wheel has a horizontal axle aligned perpendicular to the plane of the wheel and the frame has a triangular wheel suspension component comprising:

a) a first solid member with a long axis, a wide lateral side, and a relatively thin vertical side, said member being substantially more rigid laterally than vertically, said first member having a solid wide first end, and a bifurcated left/right pair of tapering segments adapted to receive the wheel, the segments having left and right second ends, said first member being solid from said first end to said left and right second ends;

b) a second strut member, with a long axis, longitudinally expandable and compressible, comprising a unitary top segment with a first end and an integrated shock absorbing means adapted to dampen the longitudinal movement, and a bifurcated left/right pair of bottom segments adapted to receive the wheel, the bottom segments having left and right second ends, wherein said second left end of said second member is rigidly attached to said second left end of said first member and said second right end of said second member is rigidly attached to said second right end of said first member, and a left/right pair of wheel dropouts is integrally located proximal to the second ends of the first member and second ends of the second member and adapted to receive the axle of the wheel; and c) a rigid third member with a first and second end wherein said first end is attached to said first end of said first member, and said second end is attached to said first end of said second member.

22. The suspension system of claim 21 wherein the first member contains five longitudinally contiguous zones, a front attachment zone located adjacent to the junction with the third member, a front flex zone located adjacent to and rearward from the front attachment zone, a middle zone adjacent to and rearward from the front flex zone, a rear flex zone adjacent to and rearward from the middle zone and a rear attachment zone adjacent to and rearward from the rear flex zone and also adjacent to the junction of the first and second members, said zones having different lateral dimensions such that front and rear flex zones are more vertically flexible than their adjacent attachment zones.

23. The suspension system of claim 21 wherein the first member contains a multiplicity of apertures through the lateral side.

24. The suspension system of claim 23 wherein the apertures are generally triangular.

25. The suspension system of claim 24 wherein the first member contains five longitudinally contiguous zones, a front attachment zone located adjacent to the junction with the third member, a front flex zone located adjacent to and rearward from the front attachment zone, a middle zone adjacent to and rearward from the front flex zone, a rear flex zone adjacent to and rearward from the middle zone and a rear attachment zone adjacent to and rearward from the rear flex zone and also adjacent to the junction of the first and second members, said zones adapted to different lateral dimensions such that front and rear flex zones are more vertically flexible than their adjacent attachment zones.

26. The suspension system of claim 25 wherein lateral dimensions from the long axis of the first member are asymmetrical.

27. The suspension system of claim 21 wherein the shock absorbing means of the second substantially eliminates torsional flex of the first member.

28. The suspension system of claim 27 wherein the shock absorbing means provides for angulation of the second segment of the second member relative to the first segment of the second member.

* * * * *